United States Patent
Zwern (12)

(10) Patent No.: US 6,445,364 B2
(45) Date of Patent: *Sep. 3, 2002

(54) PORTABLE GAME DISPLAY AND METHOD FOR CONTROLLING SAME

(75) Inventor: Arthur L. Zwern, San Jose, CA (US)

(73) Assignee: Vega Vista, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/895,765

(22) Filed: Jun. 28, 2001

Related U.S. Application Data

(63) Continuation of application No. 09/373,186, filed on Aug. 12, 1999, which is a continuation of application No. 09/235,096, filed on Jan. 12, 1999, now Pat. No. 6,127,990, which is a continuation of application No. 08/563,525, filed on Nov. 28, 1995, now abandoned.

(51) Int. Cl.[7] ............................. G09G 5/00; G09G 5/08
(52) U.S. Cl. ......................... 345/8; 345/156; 345/157; 345/158; 345/729; 345/781; 345/800; 463/34; 708/131; 708/141
(58) Field of Search ......................... 345/8, 729, 778, 345/764, 781, 800, 113, 427, 156, 158, 151; 463/34; 708/141, 131

(56) References Cited

U.S. PATENT DOCUMENTS

| | | | |
|---|---|---|---|
| 4,790,028 A | * | 12/1988 | Ramage ........................ 382/47 |
| 5,195,180 A | * | 3/1993 | Takakura et al. ............ 395/164 |
| 5,283,560 A | * | 2/1994 | Bartlett ........................ 345/113 |
| 5,683,297 A | * | 11/1997 | Raviv et al. ................. 345/427 |
| 5,689,287 A | * | 11/1997 | Mackinlay et al. .......... 345/427 |
| 5,844,824 A | * | 12/1998 | Newman et al. .......... 364/708.1 |
| 6,127,990 A | * | 10/2000 | Zwern ............................ 345/8 |
| 6,184,847 B1 | * | 2/2001 | Fateh et al. .................... 345/8 |

OTHER PUBLICATIONS

Goodrich GL, Mehr EB, and Darling NC: Parameters In The Use Of CCTV's and Optical Aids. Am Jour Optom, vol. 57, No. 12, pp. 881–892, 1980.*

Legge G, Pelli D, et al., Report of the Low Vision and its Rehabilitation Panel. Vision Research –A National Plan 19 94–1998, A Report of the National Advisory Eye Council, 1994, p. 313.*

* cited by examiner

Primary Examiner—Bipin Shalwala
Assistant Examiner—David L Lewis
(74) Attorney, Agent, or Firm—Perkins Coie LLP

(57) ABSTRACT

A virtual computer monitor is described which enables instantaneous and intuitive visual access to large amounts of visual data by providing the user with a large display projected virtually in front of the user. The user wears a head-mounted display containing a head-tracker, which together allow the user to position an instantaneous viewport provided by the head-mounted display at any position within the large virtual display by turning to look in the desired direction. The instantaneous viewport further includes a mouse pointer, which may be positioned by turning the user's head, and which may be further positioned using a mouse or analogous control device. A particular advantage of the virtual computer monitor is intuitive access to enlarged computer output for visually-impaired individuals.

40 Claims, 6 Drawing Sheets

PORTABLE GAME DISPLAY AND METHOD FOR CONTROLLING SAME

REFERENCE TO RELATED APPLICATIONS

This is a continuation of Co-Pending application No. 09/373,186 filed Aug. 12, 1999, which is incorporated herein by reference, which is a continuation of application No. 09/235,096 filed Jan. 12, 1999, now U.S. Pat. No. 6,127,990, also which is a continuation of application No. 08/563,525 filed Nov. 28, 1995, now abandoned.

FIELD OF THE INVENTION

The invention relates to human/computer interfaces to visual data and more particularly to systems that must display a larger amount of visual data than may be conveniently displayed in a single conventional computer monitor. The present invention uses virtual reality techniques to provide instantaneous and intuitive access to large fields of visual data, and to provide visually-impaired users with enhanced access to enlarged visual data.

DESCRIPTION OF PRIOR ART

Among the visually-impaired population, the most common approach to computer access is specialized software. and/or hardware that enlarges the image displayed on the computer monitor. This is because simpler solutions such as moving closer to the monitor, using a larger monitor, adding an optical screen magnifier, or using a spectacle-mounted telescopic system provide either limited magnification or a very limited viewing field. Examples of commercially-available screen enlargers include LP-DOS by Optelec (Westford, Mass.), Zoomtext by Ai Squared (Manchester Center, Vt.), MAGic by Microsystems Software (Framingham, Mass.), and Magnum by Arctic Technologies (Troy, Mich.). In addition, simplistic screen enlargement modules are included in both the Microsoft Windows and Apple Macintosh operating systems.

These conventional computer display magnification solutions operate by magnifying the original image of a software application's output to a "virtual page" whose size is much larger than the physical monitor. For example, with a magnification of 10, a standard 8.5"×11" page would be approximately 7 feet wide by 9 feet tall. The visually-impaired user then operates the computer by using a mouse, joystick, or cursor keys to control which portion of the virtual page is shown on the monitor at any given point in time. Since the monitor is fixed, the user is in essence moving the virtual page across the monitor, in a manner analogous to that used in closed-circuit television (CCTV) systems for magnifying book pages.

In most cases, conventional screen magnification is performed completely in software running on the host computer's central processing unit (CPU). While this provides a very low-cost solution, the data to be shown on the display must be rendered in its entirety whenever the user pans to a new location within the enlarged image. This can result in lags between commanding the computer to pan and seeing the new image. To overcome this problem, the entire virtual image can be rendered and stored in a video display buffer. Then, as the user selects a portion of the image for viewing, the required portion of the data can be quickly read out of the display buffer and sent to the display device. An example of such a hardware-accelerated screen magnifier is the Vista by Telesensory, Inc. (Mountain View, Calif.). This technique is a form of hardware acceleration known as image deflection.

Unfortunately, there are two basic shortcomings to the conventional approach, even with hardware acceleration. The first problem is spatial orientation, in that it is difficult to determine where on the page one's view is directed at any given time. This occurs because the monitor does not move, and there are no other visual cues to indicate where on the virtual page one's line of sight is facing. This spatial orientation problem is exacerbated for high magnifications and for portable systems employing small display monitors. For example, one study (Goodrich, et. al.) found mean magnifications of 15.48×for nearly 100 experienced users of closed-circuit television devices. At 15×, a 15" monitor can only display about 1% of a standard 8.5"×11" page, making most computer work essentially impossible for such users. The problem is further exacerbated by the emergence of graphically-intensive computing regimes such as Microsoft Windows and the Internet World Wide Web, where individual graphic elements may be magnified to become larger than an instantaneous viewing window, or may be automatically generated outside of the user's instantaneous viewing window without the user's awareness.

The second fundamental problem in the conventional approach is dynamic control, in that all of the various control schemes for navigating about the page are cumbersome, confusing, and slow. This is because the navigation methods are unintuitive, relying on such logic as "use joystick to move cursor around screen, and when cursor reaches the edge of the screen, the next portion of document in that direction will be displayed." Alternatively, some screen enlargers maintain the cursor at the center of the screen, and require the user to position a desired insertion point over the cursor by moving the entire virtual page with a mouse or joystick. In all cases, dynamic control is not only unintuitive, but requires use of at least one hand, which negatively impacts productivity, and may make use by physically-impaired users difficult or impossible.

Together, these spatial orientation and dynamic control problems were termed the "field navigation" problem in the National Advisory Eye Council's 1994–98 National Plan (Legge, et. al.), in which the Low Vision and its Rehabilitation Panel identified this area as a particularly promising opportunity for new technologies.

One promising new technology that is now maturing is virtual reality, which is typically defined as a computer-generated three-dimensional environment providing the ability to navigate about the environment, turn one's head to look around the environment, and interact with simulated objects in the environment using a control peripheral.

In a virtual reality system, the user is "immersed" in a synthetic environment, in which virtual objects can be located anywhere in the user's physical space. The user views these objects by wearing a head-mounted display (HMD), which uses an optical system to cause a tiny display source such as a cathode ray tube or liquid crystal display to appear as a large display screen several feet in front of the user. Since the display source (or sources in the case of two eyes) is fixed to the user's head, the display is viewable regardless of where the user points his line-of-sight. The user also wears a head-tracker, which senses the direction the user is facing, and sends this information to the host computer. The computer uses this data to generate graphics corresponding to the user's line of sight in the virtual environment. This approach to human/computer interfaces was first conceived by Ivan Sutherland in 1966 for use in military simulators, and was first commercialized in the form of the Eyephone head-mounted display by VPL Research in the late 1980s.

Prior art in this area includes a wide range of relevant patents describing low-vision aids, improved virtual reality systems and components such as HMDs and head-trackers, but none which embody or anticipate the present invention.

In the field of low-vision aids, U.S. Pat. No. 4,227,209 issued Oct. 10, 1980 discloses an electronic sensory aid for visually-impaired users including an image sensor and a display array, wherein the degree of magnification provided in the display array may be adjusted by changing the number of display elements corresponding to each sensor array element. For use in electronic sensory aid applications requiring a large depth of focus, an improved image capture approach is disclosed in U.S. Pat. No. 5,325,123 issued Jun. 28, 1994, in which the imaging camera includes an opaque stop with a small aperture, thus allowing the magnification to be adjusted by moving the camera towards or away from the object to be magnified. A non-electronic sensory aid is disclosed in U.S. Pat. No. 4,548,485 issued Oct. 22, 1985, in which an XY stage is used to move textual material across an optical viewing system that captures a portion of the textual material for enlargement.

In U.S. Pat. No. 5,125,046 issued Jun. 23, 1992, and U.S. Pat. No. 5,267,331 issued Nov. 30, 1993, an improved imaging enhancer for visually-impaired users is disclosed in which an image is captured, digitized, and electronically enhanced to increase contrast before displaying the imagery. An improvement to this approach using a head-mounted display is disclosed in U.S. Pat. No. 5,359,675, issued Oct. 25, 1994.

In the field of virtual reality systems, U.S. Pat. No. 5,367,614 issued Nov. 22, 1994 to Bisey discloses a three-dimensional computer image display system using an ultrasonic transceiver head-tracking system to control a three-dimensional display to cause the image to change its perspective in response to head movements. In addition, U.S. Pat. No. 5,442,734 issued Aug. 15, 1995 to Murakami discloses a virtual reality system incorporating a head-mounted display, head-tracker, and image processing system in which predictive tracking algorithms are used to differentially update portions of the display field to provide more rapid updating of those portions of the display field corresponding to the center of the user's visual field. In U.S. patent application No. 07/621,446 (pending) filed by VPL Research, Inc., a virtual reality system is disclosed in which spatialized audio cues are generated to provide real-time feedback to users upon successful completion of manual tasks such as grasping virtual objects using a sensor-laden glove input device.

In the head-mounted display field, U.S. Pat. No. 5,003,300 issued Mar. 26, 1991 to Wells discloses a raster-based head-mounted display that may be used to display an image to either eye. U.S. Pat. No. 5,151,722 issued Sep. 29, 1992 to Massof discloses a video-based head-mounted display featuring a unique folding optic configuration so that the device may be worn like a pair of glasses. U.S. Pat. No. 5,281,957 issued Jan. 25, 1994 to Schoolman discloses a portable computer system incorporating a head-mounted display that may be hinge-mounted to an eyeglass frame so that the display may be folded up out of the way for viewing the physical environment. A wide variety of additional patents in the area of specific design improvements for head-mounted display devices exists, however, the specific head-mounted display design approach employed to effect the present invention is not critical, so long as image quality, brightness, contrast, and comfort are maintained at high levels.

In recent years, there have been several attempts made to apply head-mounted displays to the problems of enhancing imagery for visually-impaired users. One such effort has resulted in the Low-Vision Enhancement System LVES) developed by Johns Hopkins University and marketed commercially by Visionics (Minneapolis, Minn.). The LVES device incorporates a head-mounted display with integrated cameras and an image processing system. The cameras generate an image of whatever is positioned directly in front of the user, and the image processing system enlarges the image and performs enhancement functions such as contrast enhancement. While the LVES device can provide magnified imagery of real-world objects to some visually-impaired users, it suffers from several shortcomings compared to the present invention. First, the LVES does not incorporate a head-tracker to provide a hands-free means for navigating within computer data. Further, the LVES suffers from a jitter problem exactly analogous to that experienced by users of binoculars or telescopes. In simple terms, any jitter in the user's line-of-sight is magnified by the same factor as the imagery, which causes the image provided to the user to appear unsteady.

U.S. Pat. No. 5,109,282 issued Apr. 28, 1992 to Peli discloses a novel image processing method for converting continuous grey tone images into high resolution halftone images, and describes an embodiment of the method applicable to presentation of enlarged imagery to visually-impaired users via a head-mounted display. In this device, the imagery is generated by a conventional camera manually scanned across printed text as is common in closed-circuit television systems for the visually-impaired. The head-mounted display is a Private Eye by Reflection Technologies (Waltham, Mass.), which employs a linear array of light-emitting diodes converted to the impression of a rectangular array by means of a scanning mirror. In the disclosed device, benefits of using a head-mounted display for low-vision access to printed material in portable situations are discussed, including the larger visual field, higher visual contrast, lighter weight, and smaller physical size provided by an HMD compared to a portable conventional television monitor. However, no connection to a computer for viewing computer-generated imagery is disclosed or anticipated, and no incorporation of a head-tracking device is disclosed or anticipated.

In the tracker art, a variety of tracking approaches and applications have been conceived and constructed. U.S. Pat. No. 5,373,857 issued Dec. 12, 1994 to Travers, discloses a head-tracking approach for the yaw degree of freedom in virtual reality applications consisting of a magnetic sensor disposed on a headset to produce a displacement signal relative to angular displacement of the head set with respect to the earth's magnetic field. A more sophisticated approach has been developed by the Massachusetts Institute of Technology (MIT), in which an analogous magnetic sensor is used to correct drift in a much faster differential sensor such as an accelerometer, which sensors together provide extremely rapid response and high accuracy within a single package. The MIT approach, believed to be patent-pending, additionally incorporates differential sensors to detect changes in the pitch and roll degrees of freedom, which sensors may also be corrected using slower absolute sensors such as liquid-filled capacitive tilt sensors.

Also within the tracker art, a number of devices have been disclosed which sense head movement for purposes of controlling positioning of a cursor or mouse pointer within the viewable portion of a conventional display monitor. U.S. Pat. No. 4,209,255 issued Jun. 24, 1980 to Heynau discloses a system for pilots employing a light-emitting diode mounted on the pilot's head, with photodiodes located on the display to sense the tapered energy field from the light-emitting diode for purposes of determining the pilot's aim-point within the display.

U.S. Pat. No. 4,565,999 issued Jan. 21, 1986 to King discloses a cursor control system for use with a data terminal wherein a radiation source and a radiation sensor are used to determine changes in a user's head position for purposes of controlling cursor position on the screen.

U.S. Pat. No. 4,567,479 issued Jan. 28, 1986 to Boyd discloses a directional controller for video or computer input by physically-impaired users consisting of a series of mercury switches disposed in proximity to a user's head, wherein movements of the user's head are sensed and converted into cursor control commands. This device also employs a pressure switch activated by the user's mouth which can provide a further control signal such as that generated by clicking a mouse button.

U.S. Pat. No. 4,682,159 issued Jul. 27, 1987 to Davison discloses an apparatus and method for controlling a cursor on a computer display that consists of a headset worn by the user, and a stationary ultrasonic transmitter for emitting sound waves which are picked up by receivers in the headset. These sound waves are compared for phase changes, which are converted into positional change data for controlling the cursor.

U.S. Pat. No. 5,367,315 issued Nov. 22, 1994 to Pan discloses an infrared-light based system that indicates head and eye position in real time, so as to enable a computer user to control cursor movement on a display by moving his or her eyes or head. The device is intended to emulate a standard mouse, thereby allowing use of the presently available software and hardware.

While the above examples demonstrate a well-developed art for controlling computer cursors via head movement, none disclose or anticipate application of head-controlled cursor movement within a head-mounted display, and none anticipate an approach such as the present invention wherein the cursor remains fixed at a particular position within the display while the displayed data is moved instead of the cursor. Movement of displayed data within a head-mounted display in response to head movement has heretofore been used only within virtual reality systems designed for simulating sensory immersion within three-dimensional computer simulations. In such applications, cursors or mouse pointers are not controlled by head movement, but are generated when required through the use of a separate hand-controlled input device.

While virtual reality is still a developmental technology involving exotic graphics hardware, specialized software, and long integration cycles, the concept of closing a control loop between head-tracker data and HMD imagery can be implemented analogously for viewing arbitrary computer data instead of specially-constructed virtual environments. For normally sighted individuals, this could be beneficial by providing a large virtual computer desktop surrounding the user, which can provide simultaneous access to a larger amount of visual data than is possible using the small virtual desktops currently provided on common computing platforms such as Macintosh and Windows. For visually-impaired individuals, head-tracked HMD display techniques can be used to conveniently access a magnified virtual page, and thus enable productive computer use by nearly 1,000,000 new users.

SUMMARY OF THE INVENTION

It is therefore an object of the current invention to solve the field navigation problem by combining virtual reality display techniques originally developed for military flight simulators with screen magnification techniques, in order to create a novel and intuitive display interface for visually impaired users.

It is another object of the current invention to provide an intuitive computer display interface allowing the user to automatically achieve proper spatial orientation by directly coupling the user's head orientation to the displayed portion of a magnified virtual page.

It is a further object of the current invention to provide an intuitive portable computer display interface allowing the user to automatically control the position of a cursor or mouse pointer on a computer-generated virtual page by directly coupling the user's head movements to movements of a cursor across the virtual page, thus freeing the user's hands for other tasks.

It is an additional object of the present invention to provide hands-free instantaneous selection from between many concurrently active computer applications by changing one's line-of-sight from one application window's virtual location to another.

It is yet another object of the present invention to provide and maintain a cursor at a user-selectable position within the user's field-of-view, in order to support use of the virtual computer display by users with arbitrary, non-central preferred retinal loci.

It is still another object of the present invention to alert the user to events occurring outside of the user's instantaneous field-of-view through the use of spatialized audio alerts perceived to originate from the direction of the event, thus causing the user to turn and look in the direction of the event.

It is yet a further object of the present invention to provide effective operation at magnifications much greater than those possible using fixed monitors, by using a novel technique known as spatial compression.

It is still another object of the present invention to provide improved scrolling of imagery across the user's field-of-view, through application of smoothing, thresholding, prediction, and drift compensation algorithms to improve response to raw data representing the user's instantaneous line of sight.

It is still a further object of the present invention to provide a computer display for visually-impaired users that is convenient, lightweight, low-cost, minimally power hungry, and capable of portable operation without degraded performance.

It is another object of the present invention to provide a means for visually-impaired users to view enlarged video imagery in real time over an expanded field-of-regard, thus reducing jitter compared to head-mounted closed-circuit television systems.

In accordance with the present invention, there has been devised a "virtual computer monitor" (VCM) which is broadly comprised of a head-mounted display means worn by the user, a head-orientation sensing means worn by the user, and software means for interfacing these devices to a host computer such that the user's head orientation data is processed to determine which portion of an arbitrary software application's output imagery to display. By properly matching the angle of head rotation to the extent of scrolling across the magnified image, the image can be made to appear fixed in space. The particular location of the portion of the virtual image which is actually being seen by the user is dependent upon the direction in which the user looks. As the user looks to the right, the portion of the virtual image being seen by the user is to the right of the portion of the virtual image previously being seen by the user. Similarly, as the user looks up, the portion of the virtual image being seen by the user is above the portion of the virtual image previously seen by the user. Upon initialization of the VCM device, the user triggers calibration between the user's straight-ahead line of sight and the center of the virtual page. From then on, the user can rotate her head left, right, up, and down to visually scan across the page in corresponding directions. The overall impression is analogous to a normally sighted person scanning across a newspaper page.

As applied to a computer interface device for the visually-impaired, the VCM software provides a magnification adjustment to allow each user to achieve adequate visual resolution without needlessly reducing his instantaneous viewing field. The software also provides a cursor, which nominally remains positioned at the center of the HMD physical field regardless of head movements so that the cursor can be positioned anywhere upon the virtual page by turning to face that location. A further adjustment allows setting the fixed cursor location to any arbitrary position in the HMD device's physical field, so that users with unusable portions of their visual fields can select an alternative preferred retinal loci instead of the center. A software selection also provides an overview display, which shows a reduced-magnification image of the entire virtual page, with a bold black box highlighting the outline of the instantaneous field within the entire field.

An additional important feature is the ability to temporarily adjust the cursor position in real-time using a controller peripheral such as a joystick or mouse. This feature allows fine positioning of the cursor within the field by temporarily locking the head-tracking system to freeze a portion of the virtual page on the physical display, while the controller is used to move the cursor in small increments.

An additional important feature is the ability to display image components in addition to the cursor at fixed points in the physical display, which allows menus or other icons to remain in the user's instantaneous viewing field at all times while scrolling across image content.

An additional important feature resides in the ability to reduce the lag between a head motion and display of the new direction's image by using image deflection, thresholding, smoothing, prediction, and a novel drift compensation technique to reduce display "swimming", which is caused whenever imperfect head orientation sensing causes the displayed image to not appear fixed in real-space.

An additional important feature resides in the ability to magnify images by extremely large factors using spatial field compression, where the displayed image is scrolled across the physical display at a faster rate than the head is turned. This enables use by individuals with limited head motion, and allows magnification to levels that would otherwise require turning completely around to view edges of the image.

An additional important feature resides in the use of a partially immersive HMD, which avoids simulation sickness by allowing the user to maintain a constant frame of reference in the physical world since real objects can be seen around one or more edges of the display.

It is therefore an advantage of the current invention that it solves the field navigation problem by combining virtual reality display techniques originally developed for military flight simulators with screen magnification techniques, in order to provide a novel and intuitive display interface for visually impaired users.

It is another advantage of the current invention that it provides an intuitive computer display interface allowing the user to automatically achieve proper spatial orientation by directly coupling the user's head orientation to the displayed portion of a magnified virtual page.

It is a further advantage of the current invention that it provides an intuitive computer display interface allowing the user to automatically control the position of a cursor or mouse pointer on a computer-generated virtual page by directly coupling the user's head movements to movements of a cursor across the virtual page, thus freeing the user's hands for other tasks.

It is an additional advantage of the present invention that it provides hands-free instantaneous selection from between many concurrently active computer applications by changing one's line-of-sight from one application window's virtual location to another.

It is yet another advantage of the present invention that it provides and maintains a cursor at a user-selectable position within the user's field-of-view, in order to support use of the virtual computer display by users with arbitrary, non-central preferred retinal loci.

It is still another advantage of the present invention that it alerts the user to events occurring outside of the user's instantaneous field-of-view through the use of spatialized audio alerts perceived to originate from the direction of the event, thus causing the user to turn and look in the direction of the event.

It is yet a further advantage of the present invention that it provides effective operation at magnifications much greater than those possible using fixed monitors, by using a novel technique known as spatial compression.

It is still another advantage of the present invention that it provides improved scrolling of imagery across the user's field-of-view, through application of smoothing, thresholding, prediction, and drift compensation algorithms to improve response to raw data representing the user's instantaneous line of sight.

It is still a further advantage of the present invention that it provides a computer display for visually-impaired users that is convenient, lightweight, low-cost, minimally power hungry, and capable of portable operation without degraded performance.

It is another advantage of the present invention that it provides a means for visually-impaired users to view enlarged video imagery in real time over an expanded field-of-regard, thus reducing jitter compared to head-mounted closed-circuit television systems.

The above and other objects, features, and advantages of the present invention will become more readily understood and appreciated from a consideration of the following detailed description of the preferred embodiment when taken together with the accompanying drawings, which, however, should not be taken as limitative to the present invention but for elucidation and explanation only.

DETAILED DESCRIPTION OF PREFERRED EMBODIMENT

Figure 1:
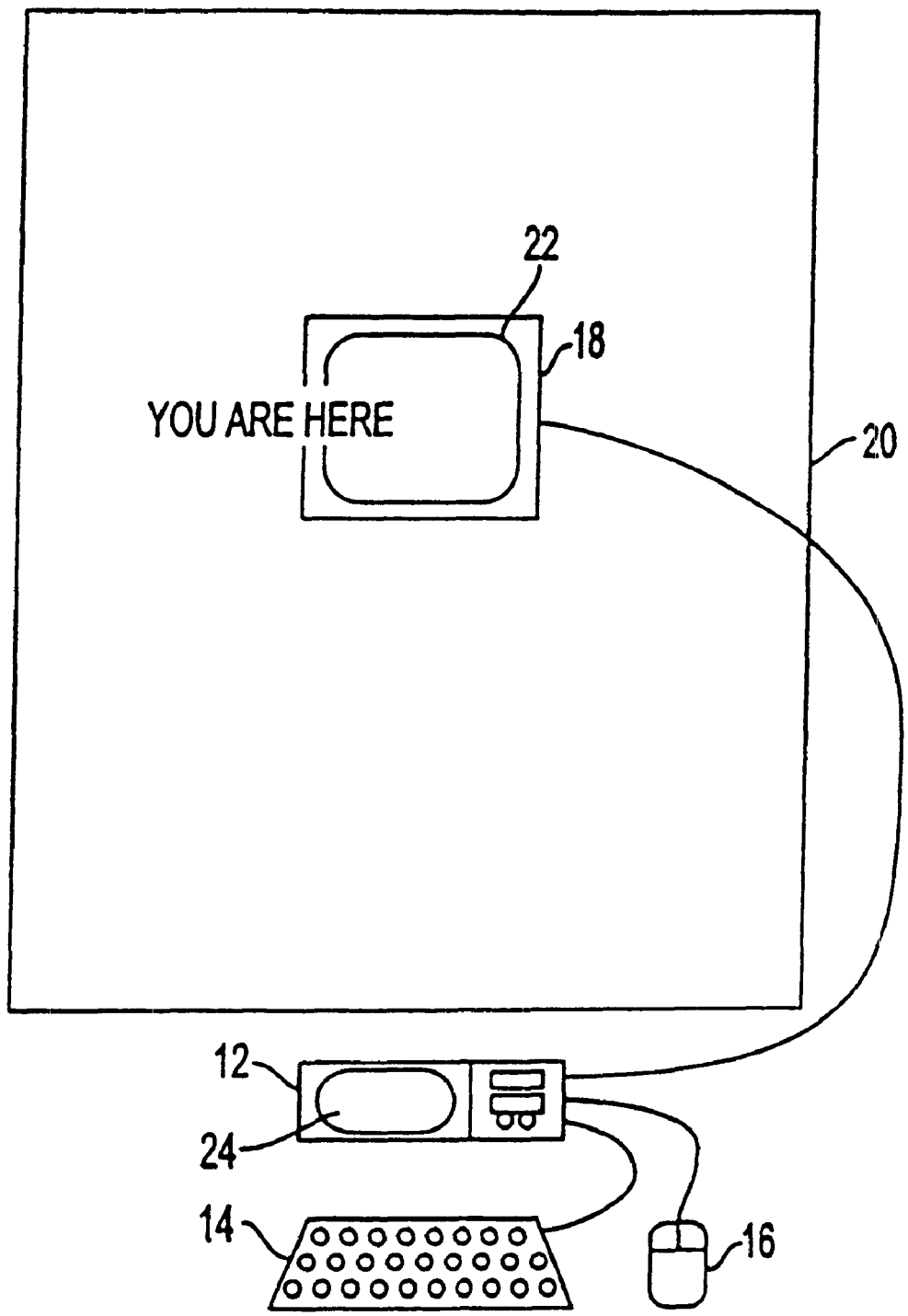
FIG. 1 is a conceptual sketch illustrating operation of a conventional screen enlarger.

The system of this invention concerns a computer 12 controlled by a user through conventional means such as a keyboard 14 and input controller 16, and whose output is viewed on a display monitor 18. Referring to FIG. 1, the invention is specifically intended for use in applications where the total amount of data to be viewed can be configured as a virtual display 20, which is significantly greater in extent than the amount of data that can be conveniently viewed within an instantaneous viewport 22 provided by the display monitor 18. An example of such an application is when the virtual display 20 consists of a large computer desktop running several application windows, while the amount of data that can be visually resolved within the instantaneous viewport 22 consists of a single application window. Another example of such an application is when the virtual display 20 consists of a word-processing document magnified for a visually-impaired user by a screen enlarger 24, which may consist of software or a combination of software and hardware. In either case, conventional control means such as a keyboard 14 or input controller 16 may be used to select which portion of the virtual display 20 is shown within the display monitor 18 at any given moment, as described in the prior art.

Figure 2:
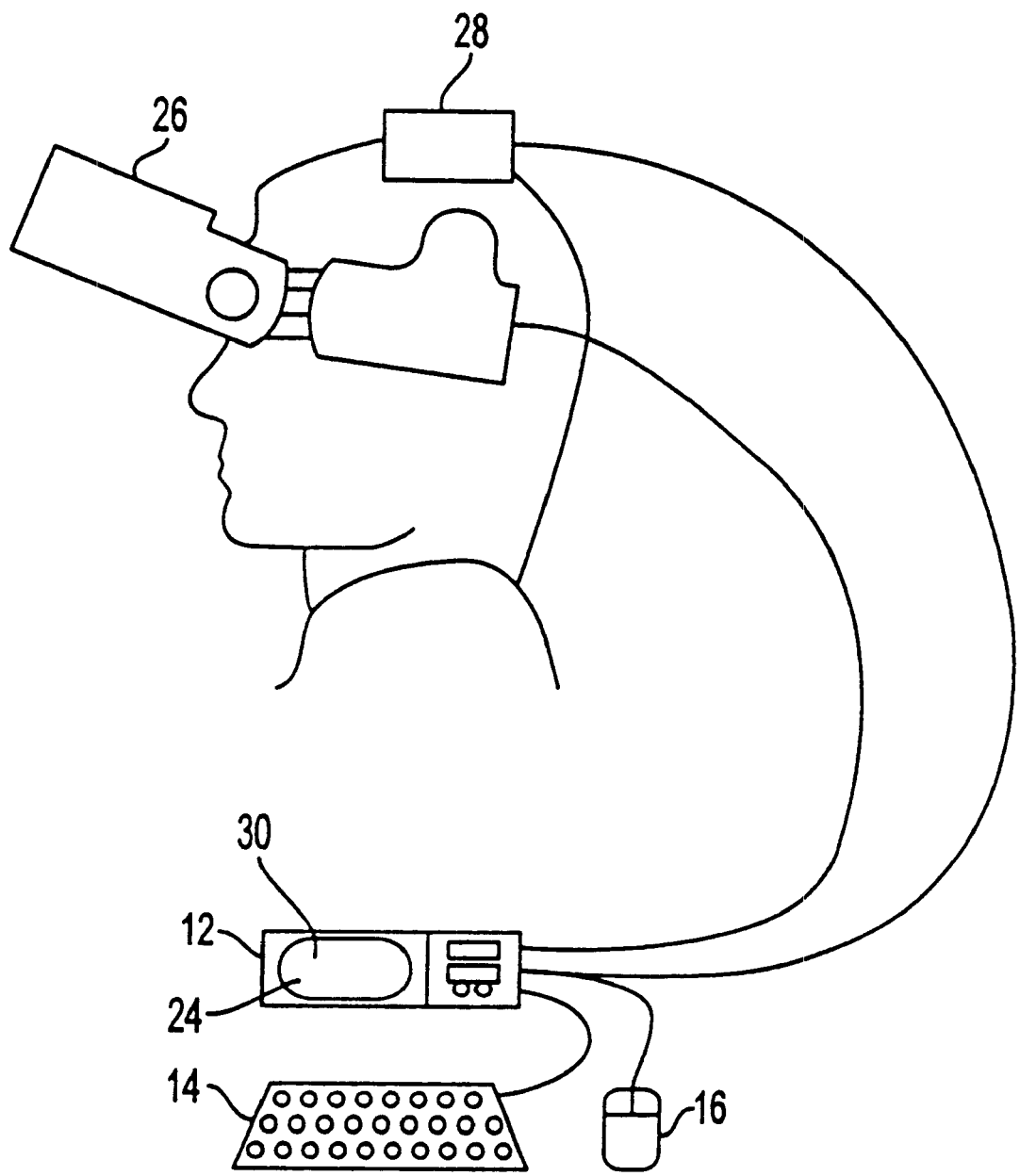
FIG. 2 is a block diagram of the hardware components of the virtual computer monitor.

Referring to FIG. 2, the most basic embodiment of the invention is achieved by implementing the display monitor as a head-mounted display 26, wherein tiny display sources such as LCDs are held within close proximity to the user's eyes, and optically coupled to the eyes with a lensing system such that the image of the computer display appears to float in space several feet in front of the user. Such devices are well known in the art, and are commercially available from sources including General Reality Company (San Jose, Calif.), Optics 1 (Westlake, Calif.), and Virtual I/O (Seattle, Wash.). In addition to the head-mounted display, the user wears a head-tracker 28, which senses changes in orientation of the user's head and reports them to the portable computer 12 to result in the perception of scrolling the instantaneous viewport 22 across the virtual display 20. Head-trackers are also well-known in the art, and a variety of different devices are available from sources including General Reality Company, Precision Navigation (Mountain View, Calif.), and Polhemus Inc. (Colchester, Vt.).

With respect to the present invention, a wide variety of different head-mounted displays 26 and head-trackers 28 may be used without affecting the fundamental operating concepts embodied therein, and many suitable devices are commercially available. For the head-mounted display 26, it is important to provide adequate field-of-view to ensure that a significant portion of the user's visual field is addressed, and to provide a sufficient number of picture elements, or pixels, so that small text can be resolved. Useful minimums are twenty degree field-of-view and 100,000 pixels per eye, although these figures are subjective. In addition, visual contrast must be high (100 to 1 or greater) for visually-impaired users. For some visually-impaired users, maximizing contrast can become sufficiently critical that a color display can not be used, and a black and white unit must be used instead. In general, parameters such as field-of-view, pixel count, contrast, size/weight, cost, and other factors such as apparent image distance well-known in the art of head-mounted display design may be traded-off to provide a best compromise over a varied population of users, or may be traded-off to optimize performance for a single user.

The simplest embodiment of the invention uses a Cyber-Track™ model head-tracker 28 from General Reality Company. This model provides an output signal emulating that of a mouse, which can be read directly by a standard Microsoft mouse driver 30 for purposes of controlling the manner in which the instantaneous viewport 22 is selected from within the virtual display 20. In alternative embodiments using a different head-tracker 28 which can not so emulate a mouse, an additional software module can be used to interpret the output of the head-tracker 28 and convert the output into "mickeys" that emulate mouse output, or an additional software module can adapt the output of the head-tracker 28 for directly controlling scrolling of the instantaneous viewport 22 without use of an intervening mouse driver. All told, a wide variety of alternative means for converting head-tracker output into scrolling of the instantaneous viewport have been conceived, so the approach selected for the present embodiments should not be considered limitative of the invention.

The portable computer 12, includes a keyboard 14 and a mouse 16. In this embodiment, software on the portable computer 12 includes screen enlarger software 24 and a Microsoft(R) mouse driver. An instantaneous viewport provided by the display 26 gives the user the perception that a virtual display is fixed in front of the user. The user may transport the display 26, the head tracker 28 and the portable computer 12 wherever the user wishes to use the device of the present invention.

Figure 3:
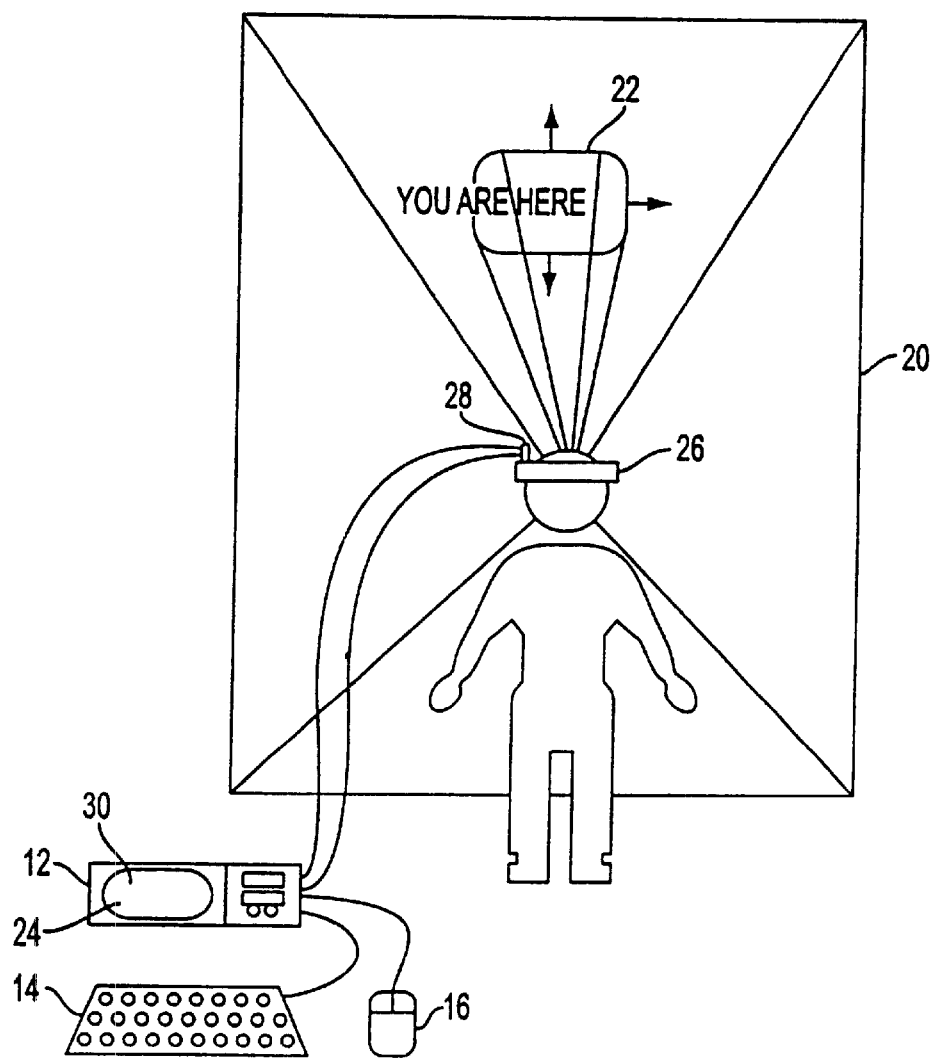
FIG. 3 is a conceptual sketch illustrating operation of a virtual computer monitor, and intuitive field navigation via head rotation.

Referring to FIG. 3, the result of the invention is to provide the user with the perception that the virtual display 20 is fixed in space in front of the user, and that the user can position the instantaneous viewport 22 provided by the head-mounted display 26 at any point within the virtual display 20 merely by rotating his or her head to look in the desired direction. Because the user's nervous system provides proprioceptive feedback which constantly provides the user with a sense of direction, and because turning to look in a particular direction is a natural and intuitive means for viewing objects in that direction, the invention provides a solution for both the spatial orientation and dynamic control aspects of the field navigation problem.

Figure 4:
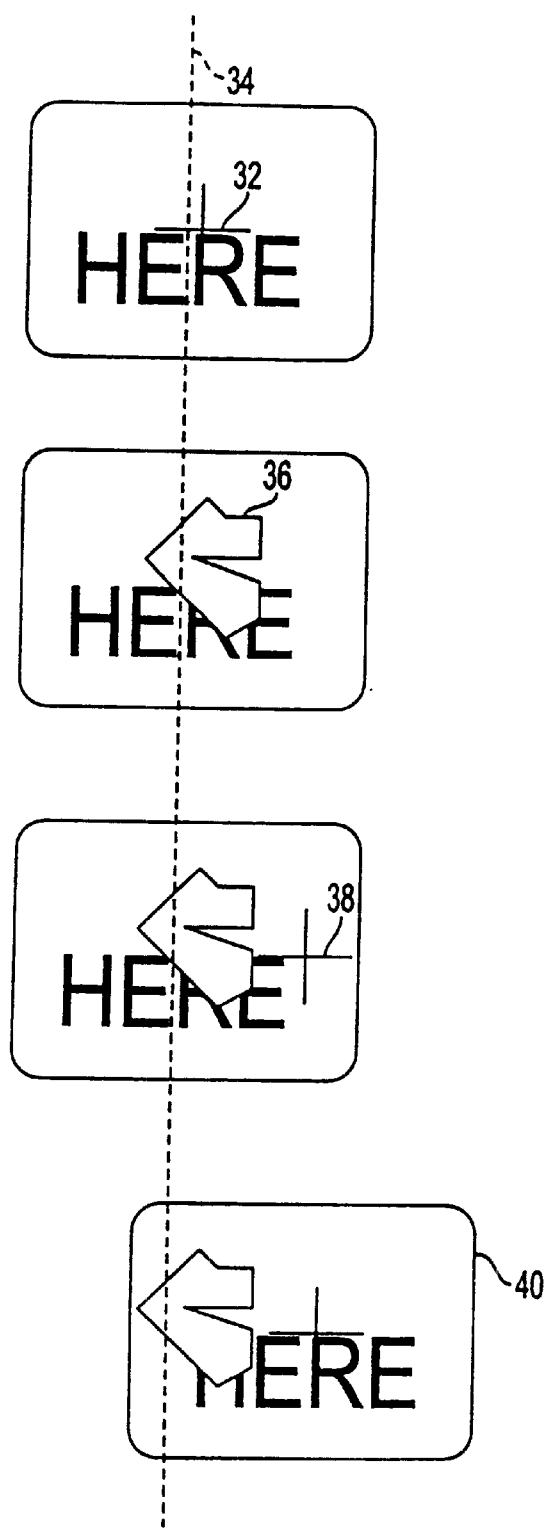
FIG. 4 illustrates various means for configuring the virtual computer monitor display, including A) typical configuration, B) typical configuration in combination with a blockage of the user's foveal vision, C) mouse pointer/cursor offset to a non-central preferred retinal locus, and D) Entire display field offset to be centered about a non-central preferred retinal locus.

Referring to FIG. 4, further detail of the instantaneous viewport is shown. Specifically, a mouse pointer 32 is shown. The mouse pointer 32 is typically maintained in the center of the instantaneous viewport 22 as the viewport is scrolled, and is used to allow selection of particular data items by the user. Such selection may be performed by clicking a button on the input controller 16. In the present invention, the mouse pointer may also be adjusted to remain at a non-central position 34 within the instantaneous viewport 22 while the viewport is scrolled. Such a non-central position 34 may be used in a case where the user suffers from a visual impairment such as macular degeneration, which can cause the foveal (central) portion of the user's visual field to be blocked, as illustrated by the visual blockage 36. An alternative approach in the event of a visual blockage is to physically rotate the head-mounted display 26 with respect to the user's line-of-sight, so that the instantaneous viewport 22 is no longer centered around the user's line-of-sight, but is instead skewed into an offset position 38.

In any of these embodiments, an improvement to the simple scrolling of the instantaneous viewport 22 can be achieved using hardware or software logic that enables scrolling using a combination of data generated by the head-tracker 28 and the input controller 16. Specifically, when the mouse is not active, head-tracker 28 output is used to perform large-magnitude positioning of the instantaneous viewport 22 with respect to the virtual display 20. Once the instantaneous viewport 22 is positioned at the approximate desired position using head movements, the input controller 16 can then be used to perform fine positioning of the instantaneous viewport. The input controller 16 can also be used to select data items, or click and drag to select multiple data items, as is common within the art. Whenever such actions are taken with the mouse, the instantaneous viewport is moved appropriately, maintaining the mouse pointer 32 at its selected location within the instantaneous viewport. In a preferred embodiment, the input controller 16 and head-tracker 28 can operate simultaneously, which allows "click & drag" functions such as holding down the mouse button to anchor one corner of a selection box, then scrolling the head until an opposing corner is reached, and releasing the mouse button to select all of the items within the resulting selection box.

The present invention has been implemented in two alternative prototype embodiments, with additional embodiments contemplated. The first embodiment is constructed using an Apple Macintosh Duo 230 portable computer 12, a General Reality CyberEye Model 100 head-mounted display 26, and InLARGE screen magnifier software by Berkeley Systems (Berkeley, Calif.). In this embodiment, the head-tracker 28 is an experimental device utilizing Gyrostar ENC-05E solid-state gyroscopes by Murata Manufacturing Company (Kyoto, Japan, and US location at Smyrna, Ga.). Two gyroscopes are used, one each for the head's pitch (elevation) and yaw (direction) degrees of freedom. The output of each gyroscope consists of a differential voltage, with the difference voltage directly proportional to the angular velocity of the sensor. These outputs are fed to the Macintosh computer 12 via the Apple Desktop Bus (ADB) Port, which is used on all Macintosh computers for accepting input from keyboards, mice, and other input control devices. Because the gyroscopes output differential data representing an angular velocity, the data is digitized using a simple analog-to-digital converter integrated circuit, and then used directly for scrolling the imagery, with only a linear scaling factor applied. This scaling factor is dependent on the magnification factor applied to the imagery, and serves to maintain the enlarged image at a fixed position in space as perceived by the user. In the case of an absolute orientation tracker such as a magnetometer, the data must first be converted from orientation to rate of change in orientation by taking the mathematical derivative of the data with respect to time.

In this first embodiment and most conceivable alternative embodiments which utilize differential head tracking devices such as gyroscopes and accelerometers, various tracking errors are introduced by the lack of a stable reference. These errors include drift, temperature instability, hysteresis, cross-axis coupling, and limited dynamic range.

Drift is evidenced by slow motions in the imagery which occur in the absence of any true head motion, and is corrected by incorporating a low-frequency cut-off filter in the tracking data output. Such low-frequency cut-off filters are well-known in the tracking art, and do not affect perceived performance.

Temperature instability is evidenced by drift that occurs following rapid changes in the ambient temperature in which the tracker is used. Some such instability is removed with software which acts like a low-frequency cut-off filter by ignoring D.C. drift, while some is unavoidable and requires a waiting period for temperature of the system hardware to stabilize. This software ignores any D.C. signal component from the head tracker 28 and allows a scaling factor to be input to the system to control the magnitude of the shift in the virtual image as a function of the amount of rotation of the user's head.

Hysteresis is evidenced by sensitivity differences between motion in one direction and motion in a direction 180 degrees opposite. This artifact can be addressed by using a different scaling factor depending upon the tracker's direction of travel. The magnitude of this scaling factor can be determined experimentally, depending upon the magnitude and direction of the hysteresis.

Cross-axis coupling is evidenced by the displayed image moving a small amount in one axis when all of the head motion is along an orthogonal axis. This artifact is also controlled by the software which acts like a low-frequency cut-off filter, and may be further controlled by disabling one axis whenever the orthogonal axis rate of motion is greater than an empirically-determined threshold.

Finally, dynamic range limitations result in upper and lower limits to the rate at which the head may be turned while still maintaining the perception that the image is fixed in space. The lower limit is nominally determined by the electronic noise floor of the sensor devices, although it is raised by addition of the low-frequency cut-off filter. The upper limit is determined by the maximum rate of change measurable by the sensor. If this rate of change is exceeded by overly rapid turning of the user's head, the imagery will appear to move in the same direction as the head is turning. This last artifact has not been solved, but may be addressed in a future embodiment through the use of an absolute position tracker.

In this first embodiment, the Apple Macintosh ADB port allows simultaneous operation of multiple input control peripherals. Because of this feature, either the input controller 16 or a variety of secondary controllers may be used in conjunction with the head-tracker 28 to perform navigation within the imagery. Such controllers include joysticks, trackballs, light pens, simple switches, or any other control device which is ADB port compatible.

The second embodiment of the invention has been implemented for the Intel/Microsoft personal computer architecture. In this embodiment, the computer 12 is a 90 Mhz Pentium host computer, the head-mounted display 26 is a CyberEye Model 100, and the head-tracker 28 is a 3-axis magnetometer, available as the Model TCM-2 from Precision Navigation, Inc. (Mountain View, Calif.) or the Cyber-Track™ from General Reality Company (San Jose, Calif.). This embodiment has been made functional using LP-DOS from Optelec (Westford, Mass.) as the screen enlarger 24, although alternative commercially available screen enlargers may be used without modifying the remaining components of the system.

In this second embodiment, the selected head-tracker 28 is an absolute orientation sensor, although any alternative head-tracking device may be used. The specific 3-axis magnetometer used as the head-tracker 28 in this embodiment connects to the serial port of the computer 12, and provides an internal conversion from absolute position to differential data in the form of mouse "mickeys" compatible with the Intel/Microsoft personal computer architecture. Because of this feature, the output of the head-tracker 28 can be read directly by a standard Microsoft mouse driver, which provides a menu for setting the scaling factor required for maintaining a fixed image as perceived by the user.

In this second embodiment, the Intel/Microsoft personal computer architecture does not make use of the Apple ADB bus, but instead uses RS-232 serial communication ports to connect to control devices such as the head-tracker 28 and the input controller 16. This complicates the system design because the standard Microsoft mouse driver can only access one serial port (and therefore one control device) at any particular moment. Since proper operation of the invention requires simultaneous response to the head-tracker 28 and the input controller 16, hardware or software is required to access two control devices simultaneously.

In the most common case of a conventional computer mouse employed as the input controller 16, this may be accomplished in one of at least five ways. First, an existing mouse driver that includes dual-port capability such as the original Borland mouse driver may be used. Second, the source code for the standard Microsoft mouse driver may be modified to support simultaneous access to two serial ports. Third, a device such as the "WhyMouse" by P.I. Engineering (Williamston, Minn.) may be used. This device serves as a "Y" adapter to connect two mouse-type pointing devices into one serial port. Circuitry internal to the WhyMouse automatically routes one or the other device's data to the serial port based on a priority scheme, wherein the first device to emit data gains control of the input. Fourth, a custom solution can be implemented in the form of a unique software driver, or fifth, in the form of a software module running on an intelligent input/output controller such as the Rocketport32 card from Industrial Computer Source (San Diego, Calif.). Such intelligent input/output controllers are available from several commercial sources in the form of a circuit board that may be inserted in an expansion slot within the computer 12. These circuit boards include two or more serial ports, as well as an on-board processor that can manipulate the inputs from the serial ports prior to delivering the tracking data to the computer's internal bus.

Of the four potential approaches to dual input device operation, the preferred embodiment exploits the fourth approach. This is because a custom software module avoids hardware costs, while providing the greatest flexibility in terms of application optimization and user convenience. For example, a custom software module allows the user to select whether the input controller 16 and head-tracker 28 can operate simultaneously in the manner preferred by the inventor, or whether the input controller 16 and head-tracker 28 operate in a priority scheme as provided in the WhyMouse product. In addition, a custom software approach can provide optional use of a variety of alternative devices as the input controller 16. For example, some users may prefer a hand-operated joystick to a mouse, while physically-impaired users may require a finger-operated joystick or head-operated directional switches with a puff & suck switch for activating the mouse clicking function.

Figure 5:
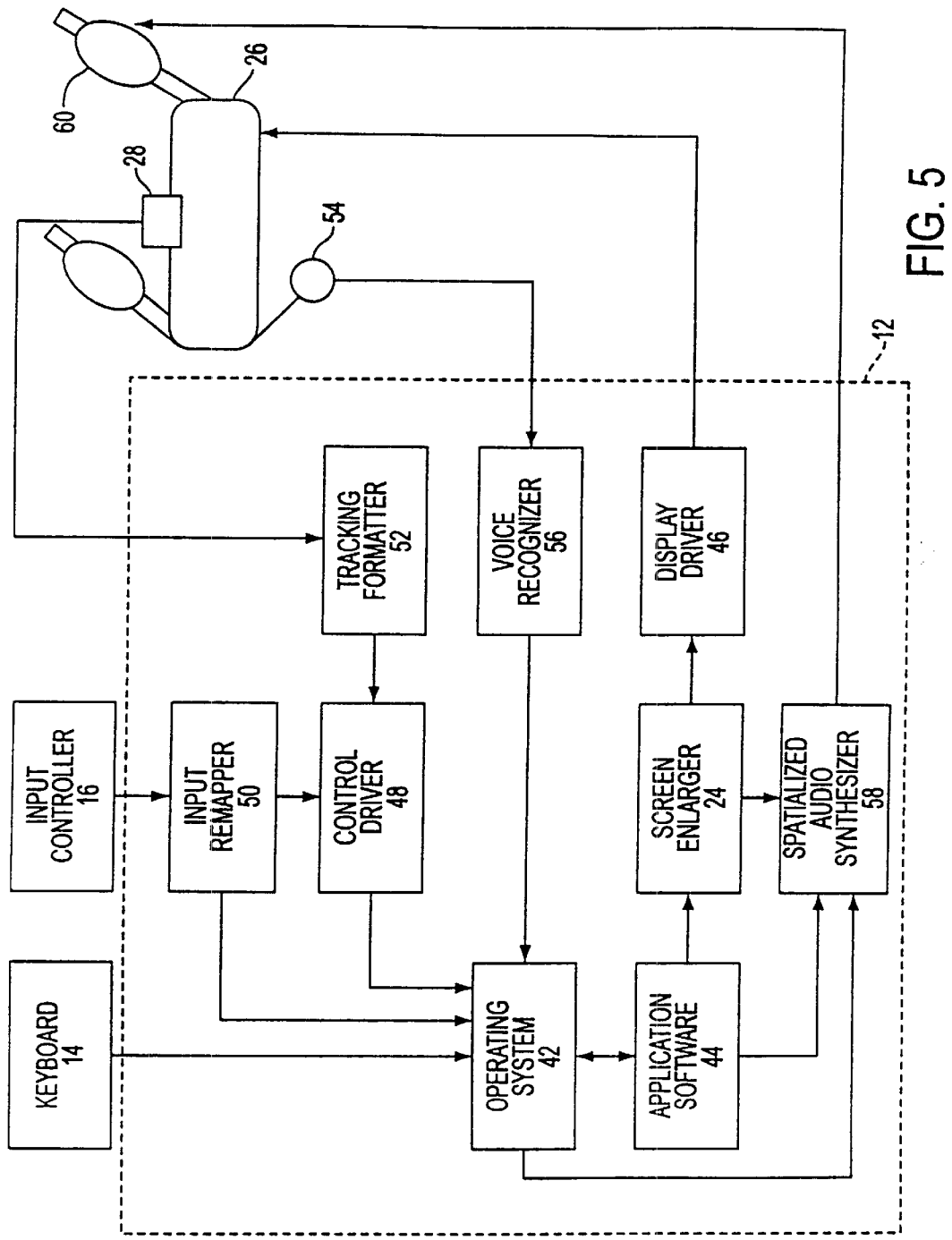
FIG. 5 is a block diagram of the logical flow of data processing in an advanced embodiment of the virtual computer monitor.

Referring to FIG. 5, a block diagram of an advanced embodiment of the invention is shown. In FIG. 5, the computer 12, keyboard 14, input controller 16, screen enlarger 24, head-mounted display 26, and head-tracker 28 are illustrated as previously defined, while a standard computer operating system such as Microsoft Windows is conceptually shown as 42, a typical computer application such as Microsoft Word is shown as 44, and a typical display driver such as a VGA graphics board is shown as 46. The software module used for combining the inputs of the input controller 16 and head-tracker 28 is shown as the control driver 48. An additional software module called the input remapper 50 is also shown interposed between the input controller 16 and the control driver 48. This input remapper 50 is a program that converts inputs from a variety of potential devices that may be used as the input controller 16 into a single convenient data format such as mouse mickeys. For example, the output of a joystick used as the input controller 16 can be remapped by the input remapper 50 so that pressing the joystick trigger button results in a mouse click signal being sent to the control driver 48, moving the joystick to the left results in emulation of sliding the mouse to the left, etc. By separating the input control software into a control driver 48 and an input remapper 50, the control driver 48 can be made standard, with only the input remapper 50 modified whenever it is desirable to support a new type of input controller 16 within the invention. The use of an input remapper 50 is a common approach in CD-ROM personal computer games, where the user can select between the mouse, joystick, keyboard, or other devices for purposes of controlling game play.

FIG. 5 also illustrates use of a tracking formatter 52, which is a software module interposed between the head-tracker 28 and the control driver 48. The tracking formatter 52 performs various functions depending upon the particular sensing means employed within the head-tracker 28. These functions can be separated into three categories.

The first category of functions performed by the tracking formatter 52 is conversion of the data stream emanating from the head-tracker 28 into a format readable by the control driver 48. This conversion is tracking sensor-dependent. In the case of a magnetometer-based tracker with mouse emulation as used in the Intel/Microsoft embodiment, no conversion is required. In the case of a magnetometer without mouse emulation, the tracking output would consist of rapidly-updated azimuth and elevation position figures, in which event the tracking formatter 52 would subtract the prior position sample from the present sample and then convert the format to mouse mickeys to provide the control driver 48 with emulated mouse output consisting of changes in position. In the case of a gyroscopic tracker with output converted to digital form such as that used in the Apple Macintosh embodiment, the output of the head-tracker 28 consists of angular velocity figures. In this event, the angular velocity samples are simply multiplied by the time period of each sample to yield a change in position, with each positional change then converted into mouse mickeys by the tracking formatter 52.

The second category of functions performed by the tracking formatter 52 consists of error correction functions such as those previously described for the Apple Macintosh embodiment of the invention. In that embodiment, the tracking formatter 52 performs low-frequency cut-off filtering, applies a directionally-dependent scaling factor, and disables one axis of travel when the orthogonal axis velocity rises above a threshold. These functions could also be performed in hardware such as an application-specific integrated circuit or a field-programmable gate array if higher-performance at high-volume production is desirable.

The third category of functions performed by the tracking formatter 52 consists of enhancement functions such as orientation prediction. This function addresses the pipeline delay between the instant in time when the head is turned, and the time when the displayed image is updated to display the new user line-of-sight. This delay can be calculated to be the sum of the tracker sensing time, tracker to computer communication time, tracker formatter processing time, control driver processing time, operating system and application software processing time, screen enlarger processing time, and display refresh time. In a typical embodiment, the sum of these delays can become bothersome, causing a perception of the display "swimming" with respect to the user's line of sight changes. This swimming causes perceptual mismatches between the user's internal proprioceptive cues and external visual cues, which in severe cases can cause disorientation and nausea effects known in the virtual reality field as simulator sickness. To avoid such effects, the current position and velocity of the head in each degree of freedom can be used to predict the future position, in the manner of So and Griffin or Azuma and Bishop. By doing so, the predicted future position can be used as the input to the processing pipeline instead of the current actual position, thus decreasing the average mismatch between the proprioceptive and visual cues.

FIG. 5 also illustrates the use of a voice recognition system as a means for inputting control commands and application data into the invention. The voice recognition system consists of a microphone 54 disposed near the user's mouth, such as by mounting onto or within the head-mounted display. The output of the microphone is input to the computer's audio input port, which digitizes the audio data. The digital data is then analyzed by a voice recognizer 56, which may consist of hardware, software, or a combination of the two. For example, a typical embodiment of the voice recognizer 56 for an Intel/Microsoft architecture would consist of Dragon Dictate software by Dragon Systems (Newton, Mass.), running on a SoundBlaster audio board by Creative Laboratories (Milpitas, Calif.). Regardless of the particular embodiment of the voice recognizer 56, the output is sent to the operating system in the form of digital data interpreted as either commands or content depending upon the state of the operating system.

The incorporation of the voice recognizer 56 enables use of convenience-enhancing commands for purposes such as positioning the virtual display with respect to the user's line-of-sight, selecting enlargement factors, controlling tracking, selecting between system operating modes, and controlling individual computer applications. For example, position commands include "center me" to center the user's instantaneous viewport 22 within the virtual display 20, "top right" to move the instantaneous viewport 22 to the top right, etc. Enlargement commands include absolute commands such as "Mag 8" to set the screen enlarger 24 to a magnification of 8 to 1, and relative commands such as "zoom double" to temporarily increase the magnification by a factor of two. Tracking control commands include "lock vertical" to lock-out response to the elevation tracking function, which simplifies scrolling horizontally across text. Selecting between system operating modes includes a complete set of commands for operating the screen enlarger 24, such as "scroll text" to enter the enlarger's text scrolling mode. Finally, application control commands are application-dependent and available commercially as libraries, which typically include most or all mouse-accessible functions such as "page down", "font: Times", "edit: cut", etc.

FIG. 5 additionally illustrates a spatialized audio generator 58, which is used to alert the user to computer-generated events occurring outside the user's instantaneous viewport 22. This is done by providing the user with slightly different signals in each ear via a pair of loudspeakers or stereo headphones 60, with the differences calculated to simulate directionality via slight delays between the nearer ear's signal and the farther ear's signal, slight reduction in high-frequency content in the farther ear's signal, and other spatial processing as is commonly known in the art. The spatialized audio generator 58 can be constructed from commercially-available components such as a SoundBlaster audio board from Creative Laboratories (Milpitas, Calif.), which includes audio spatialization software as a standard feature. The input to the spatialized audio generator 58 is provided by the operating system 42 for simple alerts such as "beeps" signifying an error or other message window, and may be provided by the application software 44 or the screen enlarger 24 for more advanced messages such as synthesized voice messages or text-to-speech conversion.

In FIG. 5, it is noted that the control driver 48 contains a scaling factor used to adjust the amount by which the instantaneous viewport 22 moves across the virtual display 20 per degree of head rotation. In most instances, this scaling factor is set so that the virtual display 20 appears fixed in space while the instantaneous viewport is scanned across it. However, for extremely high magnification factors, fixing the virtual display can be problematic, as the user's head may be required to rotate more than is comfortable to scan from one edge of the virtual display to the opposing edge. Under such conditions, the present invention may be configured by the user with a different scaling factor, which increases the amount by which the instantaneous viewport 22 moves across the virtual display 20 for each degree of head rotation. When viewed by the user, this results in the virtual display appearing to move across the user's instantaneous viewport 22 in a direction directly opposite to that in which the user is scanning. *Because the instantaneous viewport 22 and the virtual display are both moving in opposite directions, scrolling appears to be faster, but the user can scan from one edge of the virtual display 20 to the opposing edge with a smaller total head rotation. This approach to utilizing the present invention is deemed spatial field compression.

It is also noted in FIG. 5 that a snap-back function may be included within the control driver 48, wherein data from the input controller 16 is used only for temporary repositioning of the mouse pointer 32 and instantaneous viewport 22 within the virtual display 20. Specifically, this function records activity of the input controller 16 while such activity is being used to control the displayed imagery. Once such activity ceases, the inverse of the recorded activity is fed to the operating system 42, which snaps-back the image displayed in the instantaneous viewport 22 to that which would be viewed in the absence of the input controller 16. The result of this snap-back function is that the virtual display 20 is maintained at a fixed location in space, which may be temporarily modified by use of the input controller 16, but is returned to following use of the input controller 16.

It is also noted in FIG. 5 that additional image processing may be performed by the screen enlarger 24 or elsewhere in the processing pipeline to incorporate additional functions which may be desirable for visually-impaired users or other applications. For example, a common feature in commercial screen enlargers consists of contrast reversal, where instead of displaying black text on a white background, white text can be displayed on a black background. This improves text readability for some users. Another potentially useful feature is image enhancement, wherein the imagery is digitally enhanced to strengthen edges, which improves resolution ability for some users.

Finally, in FIG. 5 it is noted that if the screen enlarger 24 is set to an enlargement factor of one-to-one or omitted entirely, and a display driver 46 providing a virtual desktop function such as the MGA Millenium by Matrox (Dorval, QC, Canada) is used, then the present invention can be used in an identical fashion by a non-visually-impaired user for purposes of accessing large areas of a virtual desktop, which enhances tasks such as simultaneous use of many individual computer applications.

Figure 6:
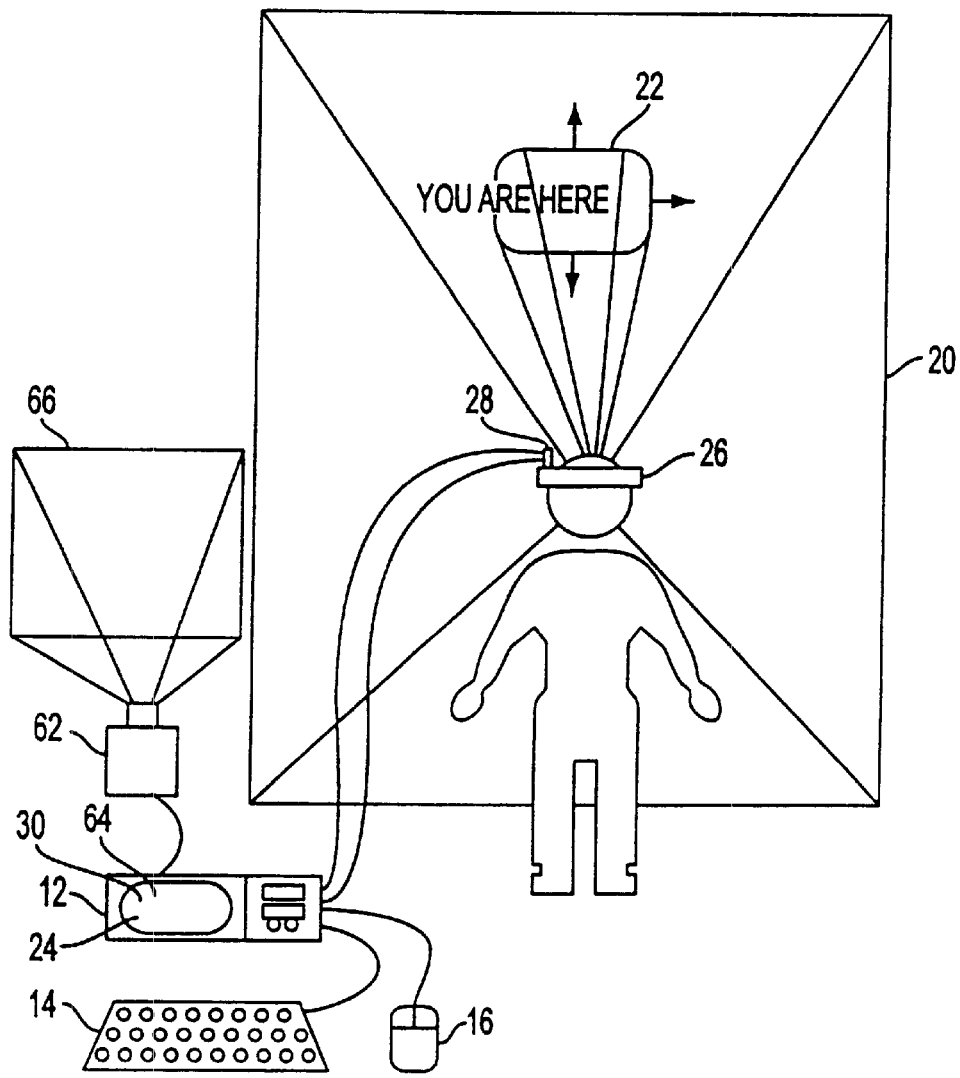
FIG. 6 is a further embodiment of the present invention applied to magnification of real-time imagery.

A further embodiment of the present invention is illustrated in FIG. 6, which shows the invention applied to magnification of real-time imagery. In this embodiment, a video camera 62 and a video frame grabber board 64 are added to any of the previously described embodiments. The video camera is then mounted in a stationary position and aimed at an image to be enlarged 66.

This image to be enlarged 66 may be a small object to be magnified such as text in a book, or may be a distant object to be resolved such as a blackboard in a classroom lecture. Each frame of video captured by the video grabber board 64 is output to the system bus as application output data by software included commercially with the video frame grabber board 64, and fed to the screen enlarger 24. The screen enlarger 24 magnifies the imagery, creating a virtual display 20 of the image to be enlarged 66 that occupies a larger angular extent as seen by the user than does the image to be enlarged 66. The head-mounted display 26, head-tracker 28, tracking formatter 52, and control driver 48 are then used as previously described to provide an instantaneous viewport 22, which may be positioned at any convenient point within the virtual display 20 by turning one's head. In this embodiment, improvement is made upon earlier closed-circuit television inventions for the visually-impaired in that the camera captures the entire image to be enlarged 66 at all times, instead of moving with the user's head or hand and capturing just the amount of imagery that can be displayed within the instantaneous viewport 22. By doing this, spatial awareness is maintained, but jitter in camera motion is not magnified to become disruptive to the user. In addition, by interposing a computer within such a closed-circuit television loop, any image may be instantly saved to permanent memory with a single keystroke for later review, editing, or printout.

While the invention has been shown and described with reference to a particular set of embodiments, it will be understood by those skilled in the art that various alterations and modifications in form and detail may be made therein. Accordingly, it is intended that the following claims cover all such alterations and modifications that may fall within the true scope and spirit of the invention.

What is claimed is:

1. A device for assisting a computer user in playing a game on a portable electronic device, said portable electronic device have a display output comprising:

a portable electronic device having a display output;

a display device coupled to said display output, said display device including an instantaneous viewing window;

a visual interface device resident on said portable electronic device, said visual interface device providing a game screen whose size is larger than said instantaneous viewing window provided by said display;

a tracking device for sensing motion of said portable electronic device, converting a sensory input generated by motion of said portable electronic device into a tracking data, and inputting said tracking data into a signal processing device, said signal processing device resident on said portable electronic device for interpreting said tracking data for determining which portion of said game screen will be displayed within said instantaneous viewing window at a particular point in time; and a game screen navigation device responsive to said sensory input, said game screen navigation device useful for assisting said computer user in navigating said game screen;

whereby said computer user can view any portion of said game screen.

2. The device as recited in claim 1, wherein said electronic device is a cellular phone.

3. The device as recited in claim 1, wherein said electronic device is a portable computer.

4. The device as recited in claim 1, wherein said electronic device is a PDA.

5. The device as recited in claim 1, wherein said electronic device is a hand-held game unit.

6. A computer implemented method for assisting a user in the control and operation of a game being played on a computer system having a portable display device, said computer implemented method comprising the steps of:

equipping a user with a portable display device coupled to a computer system;

mapping visual feedback generated by said computer system into a game screen suitable for display via said portable display device;

displaying a certain portion of said game screen via said portable display device;

tracking movement of said portable display device; and updating said certain portion of said game screen in a manner correlated to said tracked movement of said portable display device, said updated characteristics including virtual position of said displayed certain portion, wherein said computer system is display driven in that a primary source of feedback for interacting with said computer system is visual feedback generated by said computer system, said visual feedback intended for display upon any display screen coupled with said computer system.

7. The computer implemented method for assisting a user in the control and operation of a game being played on a computer system having a portable display device as recited in claim 6, wherein a set of controls corresponding to a set of pre-programmed game commands is correlated to said tracked movement of said wearable display device.

8. The method as recited in claim 7, wherein said updating of said certain portion of said game screen changes according to said set of pre-programmed game commands.

9. The computer implemented method for assisting a user in the control and operation of a game being played on a computer system having a portable display device as recited in claim 6, comprised of an additional step of updating said certain portion of said game screen in a manner correlated to said tracked movement of said wearable display device, said updating step including virtual position of said certain portion and virtual magnification of said displayed certain portion.

10. The computer implemented method for assisting a user in the control and operation of a game being played on a computer system having a portable display device as recited in claim 6, wherein the step of mapping said visual feedback into said game screen includes a substep of performing spatial field compression to reduce a required motion of said portable display device necessary for redirecting said displayed certain portion from one location within said game screen to another location within said game screen.

11. The computer implemented method for assisting a user in the control and operation of a game being played on a computer system having a portable display device as recited in claim 6, wherein said visual feedback generated by said computer system includes multiple application windows, of which one is said game screen.

12. The computer implemented method as recited in claim 11 further comprising the steps of:
monitoring a real scene in real space and time;
capturing images of said real scene; and
displaying within a first window of said multiple application windows said captured images of the real scene.

13. A computer system particularly well-suited for use by a low-vision user, said computer system running a computer game program, said computer system comprising:
a central processing unit (CPU);
a random access memory (RAM);
a wearable display device;
a motion-tracking device operable to track movement of said wearable display device;
a visual interface device resident within said computer system and executing upon said CPU, said visual interface device operable to:
a) map said visual feedback generated by said computer system into a game screen suitable for display via said wearable display device;
b) continuously display a certain portion of said game screen within said wearable display device such that said low-vision user can view said certain portion of said game screen corresponding to a portion of said game screen which is located within a line of sight of said low-vision user; and
c) adjust a magnification of said game screen in accordance with input from said low-vision user,
wherein said computer system is display driven in that a primary source of feedback for interacting with said computer system is visual feedback generated by said computer system, said visual feedback intended for display upon a display screen coupled with said computer system.

14. The computer system as recited in claim 13, wherein said visual interface device further operates to update said wearable display device such that said certain portion displayed maintains said correspondence with said portion of said game screen which is located within said line of sight of said low-vision user.

15. The computer system as recited in claim 13, wherein said visual interface device further operates to update said wearable display device such that said certain portion displayed maintains said correspondence with a set of game commands, which correspond to a set of head movements of said low-vision user.

16. A computer system as recited in claim 13 further comprising:
a video camera coupled to said computer system;
a real-time imagery device implemented upon said computer system, said real-time imagery device operable to utilize said video camera in order to a) monitor a real scene in real space and time, b) capture images of said real scene, and c) provide said captured images of said real scene somewhere within said game screen.

17. A computer implemented method for assisting a user in the control and operation of a computer system having a display screen coupled with a computer system, said computer executing a computer game, the computer implemented method comprising the steps of:
equipping said user with a portable display device coupled to said computer system;
mapping visual feedback generated by said computer system and intended for display upon a display screen into a game screen suitable for display by said portable display device;
continually displaying a certain portion of said game screen within said portable display device such that said user can view said certain portion of said game screen; tracking motion of said portable display device including discrete motion gestures initiated by said user;
and wherein when said tracked motion corresponds to a request for a special discrete command, performing said special discrete command.

18. The computer implemented method as recited in claim 17 wherein said detected motion is a motion towards said user and said special discrete command is an increase in magnification of said displayed certain portion of said game screen.

19. The computer implemented method as recited in claim 18 wherein said degree of increase in magnification is a function of acceleration of said detected motion.

20. The computer implemented method as recited in claim 17 wherein said detected motion is a motion away from said user and said special discrete command is an decrease in magnification of said displayed certain portion of said game screen.

21. The computer implemented method as recited in claim 20 wherein said degree of decrease in magnification is a function of said acceleration of said detected motion.

22. The computer implemented method as recited in claim 17 wherein said detected motion is a particular motion and said special discrete command is a command which corresponds to a particular command of said game program being executed on said computer.

23. The computer implemented method as recited in claim 22, wherein said particular motion is upward.

24. The computer implemented method as recited in claim 22, wherein said particular motion is downward.

25. The computer implemented method as recited in claim 22, wherein said particular motion is to said user's left.

26. The computer implemented method as recited in claim 22, wherein said particular motion is to said user's right.

27. The computer implemented method as recited in claim 22, wherein said particular motion is a rotation left motion.

28. The computer implemented method as recited in claim 22, wherein said particular motion is rotation right motion.

29. The computer implemented method as recited in claim 22, wherein said particular motion is rotation of the top of said electronic device towards said user.

30. The computer implemented method as recited in claim 22, wherein said particular motion is rotation of the bottom of said electronic device towards said user.

31. The computer implemented method as recited in claim 22, wherein said particular motion is rotation of the left side of said electronic device towards said user.

32. The computer implemented method as recited in claim 22, wherein said particular motion is rotation of the right side of said electronic device towards said user.

33. The computer implemented method as recited in claim 22, wherein said detected motion is an abrupt motion.

34. The computer implemented method as recited in claim 22, wherein said detected motion is a shaking motion of said portable device and said particular command is said equivalent of a restart game command.

35. The computer implemented method as recited in claim 17, wherein a neutral display position is the image presented when said device is not in motion, and said special discrete command includes a step of setting a current field of view to the neutral position.

36. The computer implemented method as recited in claim 17 wherein said portable display device and said portable control device are formed as a single unit.

37. The computer implemented method as recited in claim 17 wherein said portable display device and said portable control device are separate devices.

38. The computer implemented method as recited in claim 17 wherein said computer system is housed within said portable display device.

39. The computer implemented method as recited in claim 17 wherein said computer system is housed within a portable control device.

40. The computer implemented method as recited in claim 17 wherein said computer system is remote from said portable display device.

* * * * *